United States Patent
Kim et al.

(10) Patent No.: US 12,479,381 B2
(45) Date of Patent: Nov. 25, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventors: Hyunsang Kim, Hwaseong-si (KR); Yun Sup Ann, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 202 days.

(21) Appl. No.: 18/206,380

(22) Filed: Jun. 6, 2023

(65) Prior Publication Data

US 2024/0075893 A1 Mar. 7, 2024

(30) Foreign Application Priority Data

Sep. 6, 2022 (KR) .......................... 10-2022-0112488

(51) Int. Cl.
*B60R 16/037* (2006.01)
*G06F 21/32* (2013.01)
*G06V 20/58* (2022.01)
*G06V 40/16* (2022.01)

(52) U.S. Cl.
CPC ............ *B60R 16/037* (2013.01); *G06F 21/32* (2013.01); *G06V 20/58* (2022.01); *G06V 40/172* (2022.01)

(58) Field of Classification Search
CPC .... B60R 16/037; G06V 20/58; G06V 40/172; G06F 21/32
See application file for complete search history.

(56) References Cited

U.S. PATENT DOCUMENTS

| | | | |
|---|---|---|---|
| 2008/0197781 A1* | 8/2008 | Dobrusskin | H05B 47/175 315/149 |
| 2019/0248334 A1* | 8/2019 | Greenberg | B60R 25/23 |
| 2019/0340423 A1* | 11/2019 | Kim | G06V 40/165 |
| 2022/0024415 A1* | 1/2022 | Wu | E05F 15/76 |

\* cited by examiner

*Primary Examiner* — Vivek D Koppikar
*Assistant Examiner* — Jeffrey R Chalhoub
(74) *Attorney, Agent, or Firm* — Morgan, Lewis & Bockius LLP

(57) ABSTRACT

A vehicle providing a personalization setting function using a camera used for a face authentication system includes: a camera configured to have a field of view facing an outside of the vehicle; a communicator configured to wirelessly communicate with a remote controller of the vehicle; a storage storing a plurality of reference face images and a personalization setting corresponding to each of the plurality of reference face images; and a controller electrically connected to the camera, the communicator and the storage and configured to: detect the remote controller based on a signal received from the remote controller through the communicator; activate the camera based on the remote controller being detected; and control at least one electronic device of the vehicle according to a personalization setting corresponding to a first reference face image among the plurality of reference face images, based on a similarity score between the first reference face image and a first image obtained from the camera being greater than a first threshold value.

18 Claims, 10 Drawing Sheets

| REMOTE CONTROLLER | TOUCH INPUT |

VEHICLE AND CONTROL METHOD THEREOF

CROSS-REFERENCE TO RELATED APPLICATION

The present application claims priority to Korean Patent Application No. 10-2022-0112488, filed on Sep. 6, 2022, the entire contents of which is incorporated herein for all purposes by this reference.

BACKGROUND OF THE PRESENT DISCLOSURE

Field of the Present Disclosure

The present disclosure relates to a vehicle provided with a face recognition system and a control method thereof.

Description of Related Art

Face authentication technology, which is one of the biometric authentication technologies, is an authentication technology of determining whether a user is a valid user based on a face displayed in a still image or video.

Recently, the face authentication technology is widely used in various application fields such as security systems, mobile authentication systems, and vehicle access and starting systems due to the convenience and efficiency of face authentication technology.

When face authentication technology is applied to vehicle access and starting systems, a camera has a field of view facing outside and is used only for face authentication.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle which may provide a personalization setting function using a camera used for a face authentication system, and a control method thereof.

Additional aspects of the present disclosure will be set forth in part in the description which follows, and in part, will be obvious from the description, or may be learned by practice of the present disclosure.

According to an exemplary embodiment of the present disclosure, there is provided a vehicle, including: a camera configured to have a field of view facing an outside of the vehicle; a communicator configured to wirelessly communicate with a remote controller of the vehicle; a storage configured for storing a plurality of reference face images and a personalization setting corresponding to each of the reference face images; and a controller electrically connected to the camera, the communicator and the storage and configured to: detect the remote controller based on a signal received from the remote controller through the communicator; activate the camera based on the remote controller being detected; and control at least one electronic device of the vehicle according to a personalization setting corresponding to a first reference face image among the plurality of reference face images, based on a similarity score between the first reference face image and a first image obtained from the camera being greater than a first threshold value.

Also, the controller may be configured to store the first image in the storage as the plurality of reference face images, based on the similarity score being greater than or equal to an authentication threshold value and less than a second threshold value, and the first threshold value may be less than the authentication threshold value.

Also, the controller may be configured to store the first image in the storage as the plurality of reference face images, based on receiving a user input indicating a user intention to register the first image as the reference face image, in response to the similarity score being greater than a third threshold value and less than the authentication threshold value, and the third threshold value may be greater than the first threshold value.

Also, the controller may be configured to control the at least one electronic device according to the personalization setting corresponding to the first reference face image, based on a door of the vehicle being detected to be opened.

Also, the controller may be configured to deactivate the camera based on a door of the vehicle being detected to be opened.

Also, the controller may be configured to activate the camera for a preset time period based on receiving a door unlock request signal from the remote controller through the communicator.

Also, the controller may be configured to activate the camera until a door of the vehicle is detected to be opened, based on receiving a response signal from the remote controller through the communicator.

Also, the vehicle may further include a sensor provided in a door handle, and the controller may be configured to activate the camera, based on the sensor being touched or pressed.

Also, the vehicle may further include a visual indicator provided around the camera, and the controller may be configured to: control the visual indicator to provide a first visual feedback, in response to the camera being activated based on the remote controller being detected; and control the visual indicator to provide a second visual feedback, in response to the camera being activated based on the remote controller being touched or pressed.

Also, the first visual feedback may include light with a first brightness, the second visual feedback may include light with a second brightness, and the first brightness may be greater than the second brightness.

According to an exemplary embodiment of the present disclosure, there is provided a control method of a vehicle including a storage configured for storing a plurality of reference face images and a personalization setting corresponding to each of the reference face images, the control method including: detecting a remote controller based on a wireless signal received from the remote controller; activating a camera configured to have a field of view facing an outside of the vehicle based on the remote controller being detected; and controlling at least one electronic device of the vehicle according to a personalization setting corresponding to a first reference face image among the plurality of reference face images, based on a similarity score between the first reference face image and a first image obtained from the camera being greater than a first threshold value.

Also, the control method may further include storing the first image in the storage as the plurality of reference face images, based on the similarity score being greater than or equal to an authentication threshold value and less than a second threshold value, and the first threshold value may be less than the authentication threshold value.

Also, the control method may further include storing the first image in the storage as the plurality of reference face images, in response to receiving a user input indicating a user intention to register the first image as the reference face image, based on the similarity score being greater than or equal to a third threshold value and less than the authentication threshold value, and the third threshold value may be greater than the first threshold value.

Also, the controlling of the electronic device of the vehicle according to the personalization setting corresponding to the first reference face image may be performed based on an opening of a door of the vehicle being detected.

Also, the control method may further include deactivating the camera based on an opening of a door of the vehicle being detected.

Also, the activating of the camera may include activating the camera for a preset time period, based on receiving a door unlock request signal from the remote controller.

Also, the activating of the camera may include activating the camera until an opening of a door of the vehicle is detected, based on receiving a response signal from the remote controller.

Also, the control method may further include activating the camera, based on a sensor provided in a door handle being touched or pressed.

Also, the control method may further include controlling a visual indicator, provided around the camera, to provide a first visual feedback, in response to the camera being activated based on the remote controller being detected; and controlling the visual indicator to provide a second visual feedback, in response to the camera being activated based on the remote controller being touched or pressed.

Also, the first visual feedback may include light with a first brightness, the second visual feedback may include light with a second brightness, and the first brightness may be greater than the second brightness.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
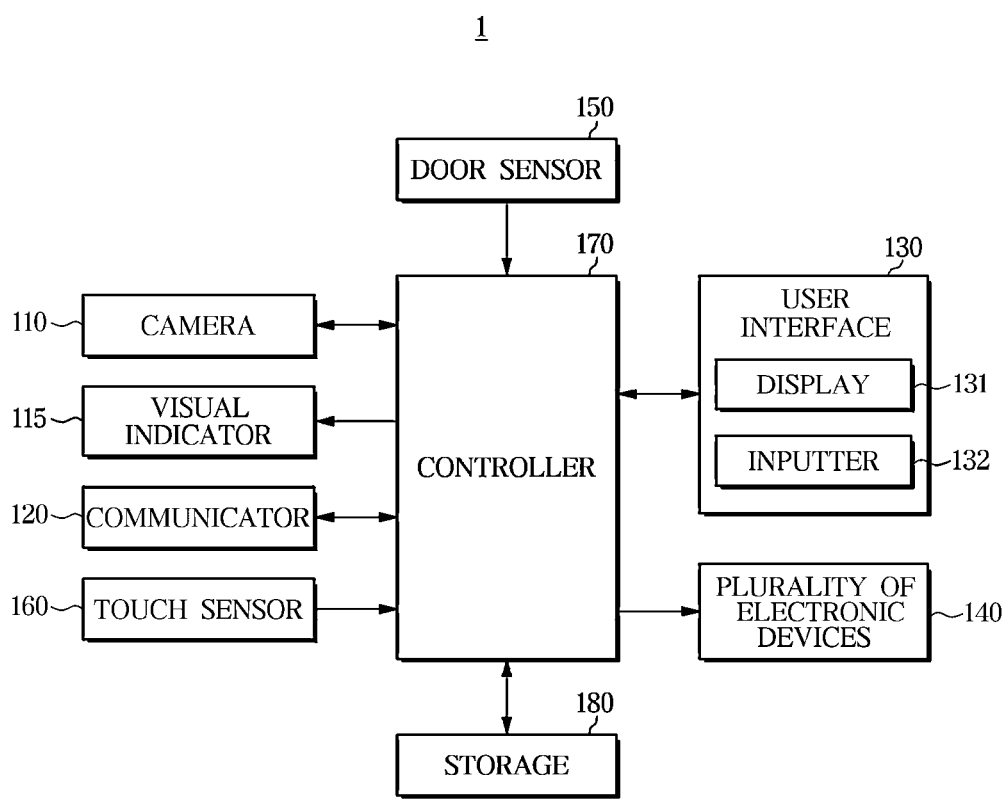
FIG. 1 is a block diagram illustrating a configuration of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Advantages and features of embodiments, and methods of achieving a same may be clearly understood with reference to the accompanying drawings and the following detailed embodiments. However, the present inventive concept is not limited to various exemplary embodiments described herein, but may be implemented in various different forms. Embodiments are provided to explain the present inventive concept for those skilled in the art. The scope of the present inventive concept is defined by the appended claims.

The terms used herein are briefly described and embodiments are described in detail.

Although the terms used herein are selected among general terms that are currently and widely used in consideration of functions in embodiments, these may be changed according to intentions or customs of those skilled in the art or the advent of new technology. Furthermore, in a specific case, some terms may be arbitrary selected by applicants. In the instant case, meanings thereof are described in a corresponding description of embodiments. Therefore, the meanings of terms used herein should be interpreted based on substantial meanings of the terms and content of the present entire specification, rather than simply the terms themselves.

Throughout the present specification, when a certain portion "includes" a certain component, it means that another component may be further included not excluding another component unless otherwise defined. Moreover, terms described in the specification such as "part" refer to a unit of processing at least one function or operation, and may be implemented by software, a hardware component such as a field-programmable gate array (FPGA) or an application-specific integrated circuit (ASIC), or a combination of software and hardware. However, the term "part" is not limited to software or hardware. "Part" may be configured in a recording medium which may be addressed or may be configured to be reproduced on at least one processor. Therefore, examples of the term "part" includes software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules so that the respective component and modules may be merged in respect to the functionality.

Hereinafter, embodiments of a vehicle and a control method thereof are described in detail with reference to the accompanying drawings. Furthermore, parts irrelevant to description are omitted in the drawings in order to clearly explain embodiments. In the accompanying drawings, parts that are identical or equivalent to each other should be assisted the same reference numerals, and in the following description of the embodiments, details of redundant descriptions thereof should be omitted.

Figure 2:
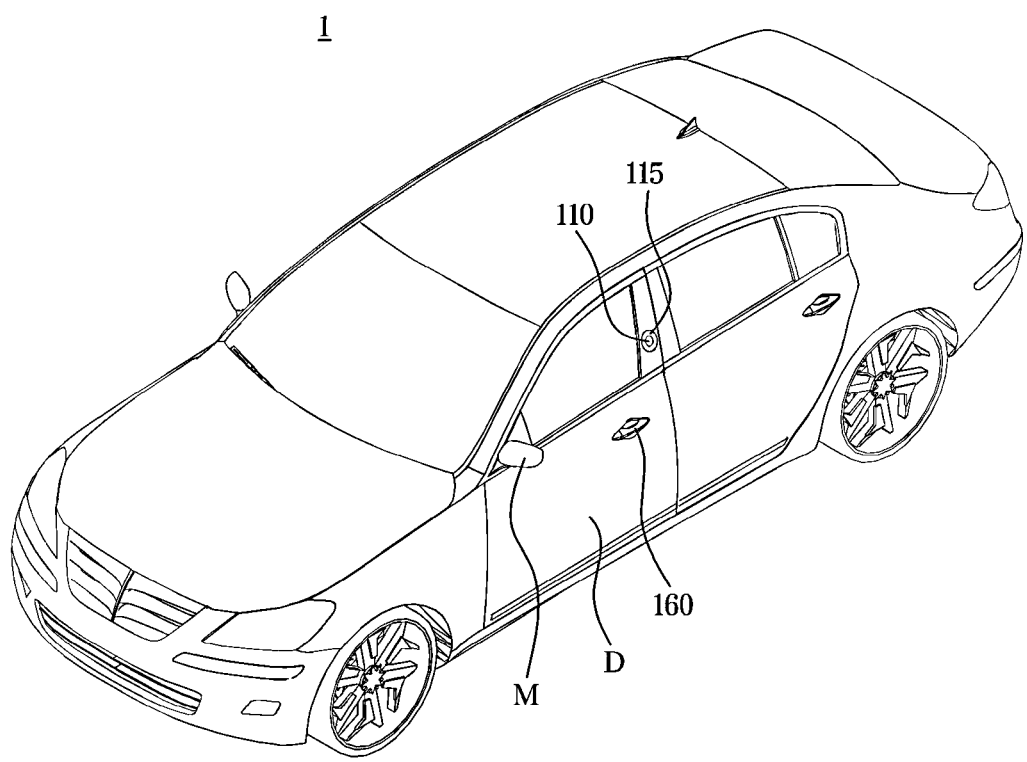
FIG. 2 illustrates an exterior of a vehicle according to an exemplary embodiment of the present disclosure.
Figure 3:
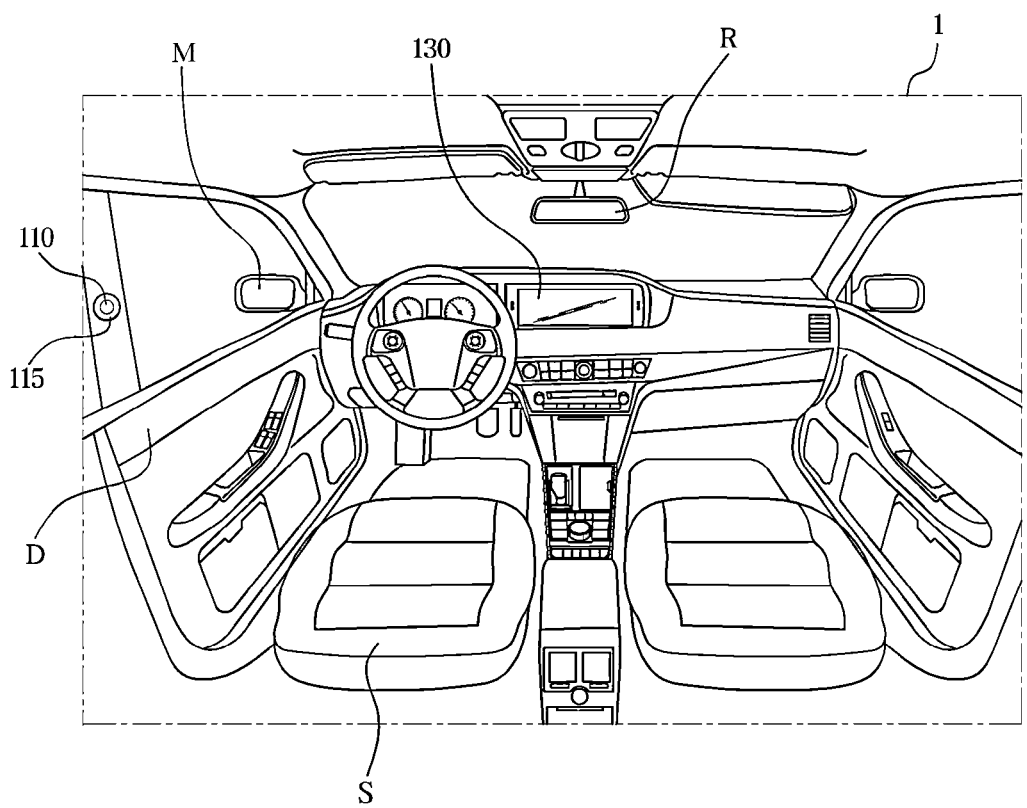
FIG. 3 illustrates an interior of a vehicle according to an exemplary embodiment of the present disclosure.

FIG. 1 is a block diagram illustrating a configuration of a vehicle according to an exemplary embodiment of the present disclosure. FIG. 2 illustrates an exterior of a vehicle according to an exemplary embodiment of the present disclosure. FIG. 3 illustrates an interior of a vehicle according to an exemplary embodiment of the present disclosure.

Referring to FIG. 1, FIG. 2, and FIG. 3, a vehicle 1 according to various exemplary embodiments of the present disclosure may include a camera 110, a visual indicator 115, a communicator 120, a user interface 130, a plurality of electronic devices 140, a door sensor 150, a touch sensor 160, a controller 170 and a storage 180.

The camera 110 may capture a face of a user located outside the vehicle 1 and obtain an image of the user's face (hereinafter, 'first image').

To the present end, the camera 110 may have a field of view facing the outside of the vehicle 1.

The camera 110 is for obtaining an image for face authentication, and may be defined as a face recognition camera.

The camera 110 may refer to any constituent component capable of obtaining a face image of a user. For example, the camera 110 may employ a complementary metal oxide semiconductor (CMOS) image sensor or a charge coupled device (CCD) image sensor.

The camera 110 may be mounted at a position capable of easily capturing the user's face.

For example, the camera 110 may be provided on a driver's side A pillar and/or B pillar or a passenger seat side A pillar and/or B pillar to capture the user located outside a door D of the vehicle 1.

However, the positions or the number of cameras 110 are not limited to the example above.

According to various exemplary embodiments of the present disclosure, the camera 110 may automatically adjust an exposure value depending on the amount of ambient light. The exposure value may include setting values for shutter speed, aperture, and/or international organization for standardization (ISO) sensitivity. In an exemplary embodiment of the present disclosure, the camera 110 may lower the exposure value as surroundings become brighter, and increase the exposure value as the surroundings become darker.

For example, the camera 110 may set the exposure value to a preset value or less when outdoors where sunlight shines, and set the exposure value to be greater than the preset value when indoors which is darker than outdoors.

The camera 110 may operate based on a control signal of the controller 170.

For example, the camera 110 may be switched to an activation state which is a powered state and a deactivation state which is an unpowered state.

When activated, the camera 110 may consecutively obtain the first image, transmitting the consecutively obtained first images to the controller 170.

Also, the camera 110 may be turned off when deactivated.

The visual indicator 115 is provided around the camera 110 and may provide a visual feedback indicating a state of a face authentication process or a visual feedback indicating a state of the camera 110.

The visual indicator 115 may notify the user of whether face authentication is successful through illumination of a first preset pattern.

Also, the visual indicator 115 may notify the user of whether the face authentication is in progress through illumination of a second preset pattern.

Furthermore, the visual indicator 115 may attract a user's gaze through illumination of a third preset pattern.

The first, second, and third preset patterns may include blinking patterns, intensities and/or colors of light.

Identically to the camera 110, the visual indicator 115 may be provided at driver's side A pillar and/or B pillar or a passenger seat side A pillar and/or B pillar.

The visual indicator 115 may include at least one display. The at least one display may include a light emitting diode (LED), an organic light emitting diode (OLED), a liquid crystal display (LCD), and the like.

The communicator 120 may include a remote communication module exchanging data with an external device (e.g., a server, a remote controller) and/or a short-range communication module.

For example, the communicator 120 may refer to a communication module configured for performing wireless Internet communication such as a wireless local access network (WLAN), Wireless Broadband (WiBro), Wi-Fi, Worldwide Interoperability for Microwave Access (WiMAX), high speed downlink packet access (HSDPA), etc.

Also, the communicator 120 may include a Bluetooth communication module performing wireless communication with the remote controller 2, an ultra wideband (UWB) communication module transmitting and receiving a ultra wideband signal, a radio frequency (RF) communication module and/or a low frequency (LF) communication module.

The Bluetooth communication module, the UWB communication module, the RF communication module and/or the LF communication module may each include a transmission/receiving antenna for transmitting/receiving a signal of corresponding frequency band.

The remote controller 2 may include a smart key or a key fob provided with the RF communication module, the LF communication module and/or the UWB communication module.

As an exemplary embodiment of the present disclosure, the remote controller 2 may include a digital key provided with the UWB communication module and/or the Bluetooth communication module. The remote controller 2 may include all kinds of handheld-based wireless communication devices such as a smartphone, wearable devices such as a watch, ring, bracelet, anklet, necklace, eyeglasses, contact lenses, or head-mounted-device (HMD), and the like.

In an exemplary embodiment of the present disclosure, the remote controller 2 may include the RF communication module and/or the LF communication module. Accordingly, the vehicle 1 and the remote controller 2 may perform a mutual authentication process using an LF communication network or RF communication network.

For example, when the communicator 120 transmits an LF band search signal the remote controller 2 receiving the search signal may transmit an RF band response signal to the communicator 120. The response signal may include information required for authentication, and the information required for authentication may vary depending on a purpose of authentication.

Due to characteristics of low frequency band, the LF band search signal transmitted by the communicator 120 has a shorter critical distance (hereinafter, 'LF critical distance') at which the signal is configured for being transmitted and received than that of the RF signal. When the remote controller 2 is located within the LF critical distance from the vehicle 1, the remote controller 2 may receive the search signal through the LF communication network from the communicator 120, and transmit the response signal to the communicator 120 through the RF communication network.

However, when the remote controller 2 is not located within the LF critical distance from the vehicle 1, even though the communicator 120 transmits the search signal to surroundings through the LF communication network, the remote controller 2 may not receive the signal, and thus the response signal may not be transmitted to the vehicle 1.

Accordingly, only when the remote controller 2 is located adjacent to the vehicle 1 (within the LF critical distance), the remote controller 2 may receive the search signal from the vehicle 1 and perform mutual authentication.

Therefore, when receiving the response signal to the search signal from the remote controller 2, the vehicle 1 may detect the remote controller 2.

In another exemplary embodiment of the present disclosure, the remote controller 2 may include the UWB communication module. Accordingly, the vehicle 1 and the remote controller 2 may perform mutual authentication using the UWB communication network.

For example, when the communicator 120 transmits an UWB band search signal, the remote controller 2 receiving the search signal may transmit an UWB band response signal to the communicator 120. The response signal may include information required for authentication and the information required for authentication may vary depending on a purpose of authentication.

When the communicator 120 includes at least two UWB receiving antennas, the vehicle 1 may identify a distance between the vehicle 1 and the remote controller 2 based on the response signal received from each of the UWB receiving antennas. Accordingly, when receiving the response signal to the search signal from the remote controller 2, the vehicle 1 may detect the remote controller 2.

In another exemplary embodiment of the present disclosure, the remote controller 2 may include the Bluetooth communication module. Accordingly, the vehicle 1 and the remote controller 2 may perform mutual authentication using a Bluetooth communication network.

For example, when the remote controller 2 transmits a search signal using the Bluetooth communication network, the communicator 120 receiving the search signal may transmit a response signal to the remote controller 2 using the Bluetooth communication network.

The vehicle 1 may be configured to determine the distance between the vehicle 1 and the remote controller 2 based on a strength of the Bluetooth signal received from the remote controller 2. Accordingly, the vehicle 1 may detect the remote controller 2, when receiving the Bluetooth signal from the remote controller 2.

The user interface 130 may include a display 131 for providing a variety of interfaces related to the face authentication process, and an inputter 132 for receiving various commands related to the face authentication process.

The display 131 may include at least one display. The at least one display may be a light-emitting diode (LED) panel, an Organic Light-Emitting Diode (OLED) panel, and/or a LCD panel.

The inputter 132 may include at least one input device configured for receiving various user inputs related to the face authentication process. For example, the inputter 132 may be provided as a tact switch, joystick, push switch, slide switch, toggle switch, micro switch, or touchscreen.

The user interface 130 may be implemented as an audio, video, navigation (AVN) device provided in the vehicle 1, without being limited thereto.

In an exemplary embodiment of the present disclosure, the user interface 130 may provide a user interface for registering a reference face image which is a reference in face authentication. That is, the user interface 130 may provide a user interface for performing the face authentication process.

The user may store a face image of the user itself in the vehicle 1 through the user interface 130.

For example, the user may store the user's face image as a reference face image in the storage 180 by positioning the user's face within a field of view of the camera 110 after preparation for face registration is completed by operating the user interface 130.

The plurality of electronic devices 140 may be provided with a personalization setting function.

For example, the plurality of electronic devices 140 may include a memory seat control unit adjusting an angle of each seat S, a side mirror control unit adjusting an angle of each side mirror M, a rear-view mirror control unit adjusting an angle of a rear-view mirror R and/or the user interface 130 adjusting settings of media device.

The memory seat control unit may store an angle of a seat S set by the user, and when the user gets in the vehicle 1, automatically adjust the angle of the seat S to the set angle, providing user convenience. The personalization setting may include setting the angle of the seat S by the user.

The side mirror control unit may store an angle of a side mirror M set by the user, and when the user gets in the vehicle 1, automatically adjust the angle of the side mirror M to the set angle, providing user convenience. The personalization setting may include setting the angle of the side mirror M by the user.

The rear-view mirror control unit may store an angle of a rear-view mirror R set by the user, and when the user gets in the vehicle 1, automatically adjust the angle of the rear-view mirror R to the set angle, providing user convenience. The personalization setting may include setting the angle of the rear-view mirror R by the user.

The user interface 130 adjusting settings of the media device may store default values set by the user (e.g., setting of radio frequency, navigation function, etc.) and when the user gets in the vehicle 1, adjust the settings of the media device based on the default values, providing user convenience. The personalization setting may include default values set by the user.

However, examples of the plurality of electronic devices 140 are not limited thereto, and any kind of electronic devices where personalization setting is applicable may be included in the plurality of electronic devices 140. For example, the plurality of electronic devices 140 may include an air conditioning control unit.

The user may store personalization settings of the plurality of electronic devices 140 in the vehicle 1 through the user interface 130, or through known methods.

The door sensor 150 may include at least one sensor configured for detecting an open or closed state of the door D of the vehicle 1. To the present end, the door sensor 150 may obtain information related to the open or closed state of the door D and/or data facilitating a determination whether the door D is opened or closed.

The touch sensor 160 may be provided on an external surface of the vehicle 1. For example, the touch sensor 160 may be provided on a handle of the door D of the vehicle 1.

The touch sensor 160 may receive a user's touch input and/or a physical pressure input.

For example, the touch sensor 160 may include a capacitance change type touch sensor, an electrical conductivity change type (resistance change type) touch sensor, and a light amount change type touch sensor. Also, the touch sensor 160 may be implemented as a button.

For example, the touch sensor 160 may be configured to generate an electrical signal when touched by the user's hand. As an exemplary embodiment of the present disclosure, the touch sensor 160 may be configured to generate an electrical signal when pressed by the user.

The storage 180 may store various information required for performing the face authentication process. To the present end, the storage 180 may be implemented as at least one memory.

The storage 180 may store a plurality of reference face images which are a criterion for determination about whether the user is a genuine user.

Storing the plurality of reference face images may include storing feature point information obtained based on processing the face image obtained through the camera 110.

Also, the storage 180 may store an identifier for identifying a user corresponding to each of the reference face images, and store a personalization setting corresponding to the identifier.

That is, the storage 180 may store a personalization setting corresponding to each of the reference face images.

For example, when a first reference face image corresponds to a face image of a first user, the storage 180 may store the first reference face image and personalization setting information of the first user corresponding to the first reference face image.

The controller 170 may process an image received from the camera 110, a signal received from the communicator 120, a user input received through the inputter 132, data detected from the door sensor 150, a touch input or pressure input detected from the touch sensor 160, and/or data stored in the storage 180.

Also, based on processing the various data, the controller 170 may control the camera 110, the visual indicator 115, the communicator 120, the user interface 130, the plurality of electronic devices 140, and the storage 180. The controller 170 is electrically connected to the constituent components of the vehicle 1 such as the camera 110, the visual indicator 115, the communicator 120, the user interface 130, the plurality of electronic devices 140, the door sensor 150, the touch sensor 160, the storage 180, and the like, controlling the constituent components of the vehicle 1. For example, the controller 170 may transmit and receive data with the various constituent components of the vehicle 1 through a vehicle communication network (e.g., Controller Area Network (CAN) communication).

To the present end, the controller 170 may include at least one memory storing a program performing the aforementioned operations and operations to be described below and at least one processor implementing a stored program. Also, the controller 170 may include at least one electrical control unit (ECU). For example, the controller 170 may include a face authentication control unit, a body control module, an access and starting authentication control unit, and the like.

When the controller 170 includes a plurality of memories and processors, the plurality of memories and processors may be integrated into one chip, or provided in physically separated locations. Also, the controller 170 may include an image processor for processing an image obtained from the camera 110.

In an exemplary embodiment of the present disclosure, the controller 170 may perform various functions based on the first image received from the camera 110.

For example, the controller 170 may perform the face authentication process based on the first image received from the camera 110. Also, the controller 170 may adjust a field of view of the camera 110 by moving a lens of the camera 110 or rotating the camera 110 based on the first image.

The controller 170 may perform the face authentication process of authenticating the user by comparing the first image with a reference face image stored in the storage 180.

In an exemplary embodiment of the present disclosure, the controller 170 may perform image pre-processing on the first image. The image preprocessing process may include one or more processes of processing the first image to have a form more suitable for face authentication. For example, the image preprocessing process may include a process of removing noise included in the first image, a process of increasing the contrast of the first image, a deblurring process of removing blur included in the first image, a process of removing a background region, a warping process of correcting distortion included in the first image, and a process of binarizing the first image.

The controller 170 detects a face region in the first image. The controller 170 may detect the face region in the first image using, for example, a Haar-based cascade AdaBoost classifier, a neural network-based classifier, or a support vector machine. However, the scope of the exemplary embodiment of the present disclosure is not limited thereto, and the controller 170 may detect a face region from a first image using various face region detection techniques.

The controller 170 may normalize the detected face region. In an exemplary embodiment of the present disclosure, the controller 170 may detect facial feature points (facial landmarks) in the detected facial region, and normalize the facial region based on the detected feature points. The controller 170 may detect facial landmarks in the face region, for example, using an active contour model (ACM), active shape model (ASM), active appearance model (AAM), supervised descent method (SDM), a feature-point detection technique based on a neural network, or the like. The facial feature points are feature points for major parts of a face, which are provided to identify, for example, the eyebrows, eyes, nose, lips, chin, ears, or contours of a face. Normalization may include, for example, an image cropping process of extracting a face image representing a face region from the first image, a process of matching the positions of feature points detected in the face region to predefined reference positions, and a process of adjusting the size of the extracted face region. As an exemplary embodiment of the present disclosure, the face image extracted from the first image may have a form of a patch image. The controller 170 may match the positions of the feature points to the reference positions by performing affine transformation based on the detected positions of the feature points. Here, the affine transformation serves to map a vector space represented by the positions of the feature points to another vector space.

The controller 170 may compare facial feature points of the user extracted from the first image with feature points extracted from the reference face image, to compare the first image with the reference face image, and according to a result of the comparison, determine a similarity score.

The similarity score is a score that quantifies the similarity between the facial feature points of the user extracted from the first image and the feature points extracted from the reference face image, and may be determined based on the similarity of the feature points.

The similarity score may increase as the difference between the feature values of the facial feature points of the user extracted from the first image and the feature values of the feature points extracted from the reference face image becomes smaller, and the similarity score may decrease as the difference becomes larger.

The controller 170 may employ various algorithms to determine the similarity score between the first image and the reference face image. For example, the controller 170 may execute an algorithm for comparing the feature values of the facial feature points of the user extracted from the first image with the feature values of the feature points extracted from the reference face image.

According to various exemplary embodiments of the present disclosure, the controller 170 may be configured to determine the similarity score between the first image and the reference face image using a learning model trained by machine learning.

Although the controller 170 and the storage 180 are illustrated as being separately provided, the storage 180 may correspond to one of the plurality of memories of the controller 170.

The user may register the reference face image in the storage 180 through a face registration process.

As an exemplary embodiment of the present disclosure, the controller 170 may control the user interface 130 to output a user interface (e.g., a guide message) for performing the face registration process, and the user may proceed with the face registration process through the user interface 130.

The user may store the reference face image in the storage 180 by inputting the reference face image through the camera 110 according to a guide provided by the user interface 130.

The storage 180 may store at least one reference face image. For example, the storage 180 may store at least one reference face image for each of users, and may store a plurality of reference face images for a single user.

Storing a reference face image may include storing feature values corresponding to the reference face image.

When a plurality of users use the vehicle 1, the controller 170 may specify a user based on the first image, and perform the face authentication process based on a reference face image related to the specified user.

Meanwhile, the controller 170 may activate the camera 110 based on a preset condition being satisfied.

For example, based on the touch sensor 160 provided on a handle of the door D of the vehicle 1 being touched or pressed, the controller 170 may start the face authentication process. As an exemplary embodiment of the present disclosure, the controller 170 may perform the face authentication process, based on detecting an object around the camera 110 by a proximity sensor.

The controller 170 may be configured to determine the similarity score based on comparison between the first image obtained from the camera 110 in real time and the plurality of reference face images stored in the storage 180, and when the similarity score is greater than or equal to an authentication threshold value, determine that the face authentication is successful.

When the face authentication is successful as a result of the face authentication process, the controller 170 may unlock the door D of the vehicle 1. Furthermore, when the face authentication is successful, the controller 170 may control the visual indicator 115 to output a visual indication for notifying the success of face authentication.

In contrast, when the similarity score between the first image and the plurality of reference face images is less than an authentication threshold value, the controller 170 may be configured to determine that the face authentication fails. Furthermore, when the face authentication fails, the controller 170 may control the visual indicator 115 to output a visual indication for notifying the failure of face authentication.

Meanwhile, conventionally, because existing cameras are used only for face authentication, the existing cameras are configured to be activated only when a touch sensor provided on a door handle detects a touch input or an object around the camera is detected, resulting in decrease in usability of camera.

According to an exemplary embodiment of the present disclosure, the controller 170 may detect the remote controller 2 based on a signal received from the remote controller 2 through the communicator 120, and activate the camera 110 based on the remote controller 2 being detected.

Accordingly, the camera 110 may be used for other purposes in addition to the face authentication, which is described below with reference to FIG. 4.

Figure 4:
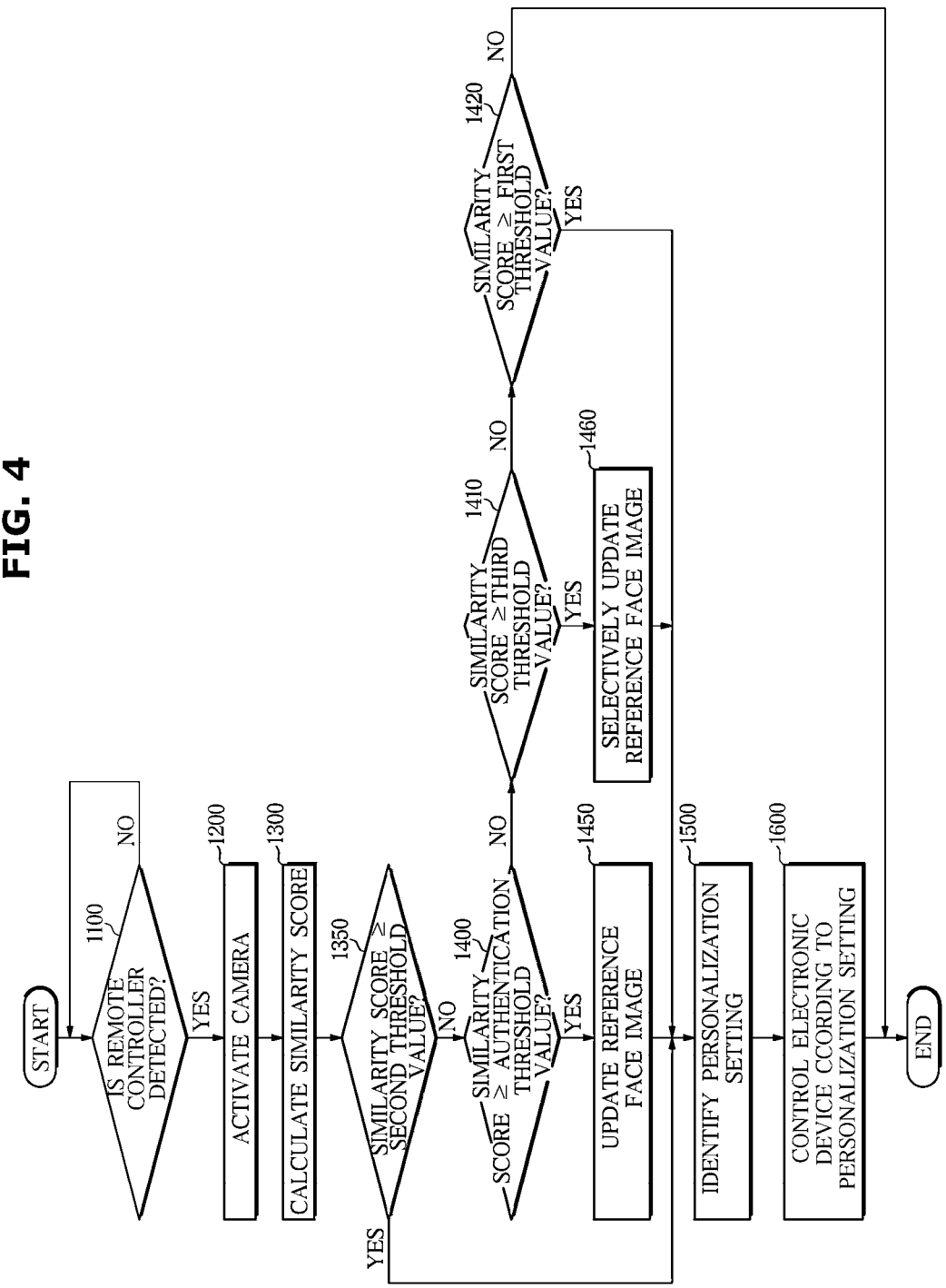
FIG. 4 is a flowchart illustrating a control method of a vehicle according to an exemplary embodiment of the present disclosure.

FIG. 4 is a flowchart illustrating a control method of a vehicle according to an exemplary embodiment of the present disclosure.

Referring to FIG. 4, the controller 170 according to various exemplary embodiments of the present disclosure may detect the remote controller 2 based on a signal received from the remote controller 2 through the communicator 120 (1100).

Detecting the remote controller 2 may include various examples.

For example, detecting the remote controller 2 may include receiving a RF band response signal transmitted from the remote controller 2 in response to an LF band search signal transmitted by the communicator 120.

As an exemplary embodiment of the present disclosure, detecting the remote controller 2 may include receiving an UWB band response signal transmitted from the remote controller 2 in response to an UWB band search signal transmitted by the communicator 120.

In an exemplary embodiment of the present disclosure, detecting the remote controller 2 may include identifying a location of the remote controller 2 based on the UWB band response signal transmitted from the remote controller 2, and detecting that the identified location of the remote controller 2 is within a preset radius based on the vehicle 1.

As yet another example, detecting the remote controller 2 may include receiving a wireless signal using a Bluetooth communication network from the remote controller 2.

In an exemplary embodiment of the present disclosure, detecting the remote controller 2 may include identifying a location of the remote controller 2 based on a strength of a Bluetooth signal transmitted from the remote controller 2 and detecting that the identified location of the remote controller 2 is within a preset radius based on the vehicle 1.

As yet another example, detecting the remote controller 2 may include receiving a control signal of RF band from the remote controller 2. For example, the control signal of RF band may include a door unlock request signal.

The controller 170 may activate the camera 110 based on the remote controller 120 being detected (1200).

Figure 5:
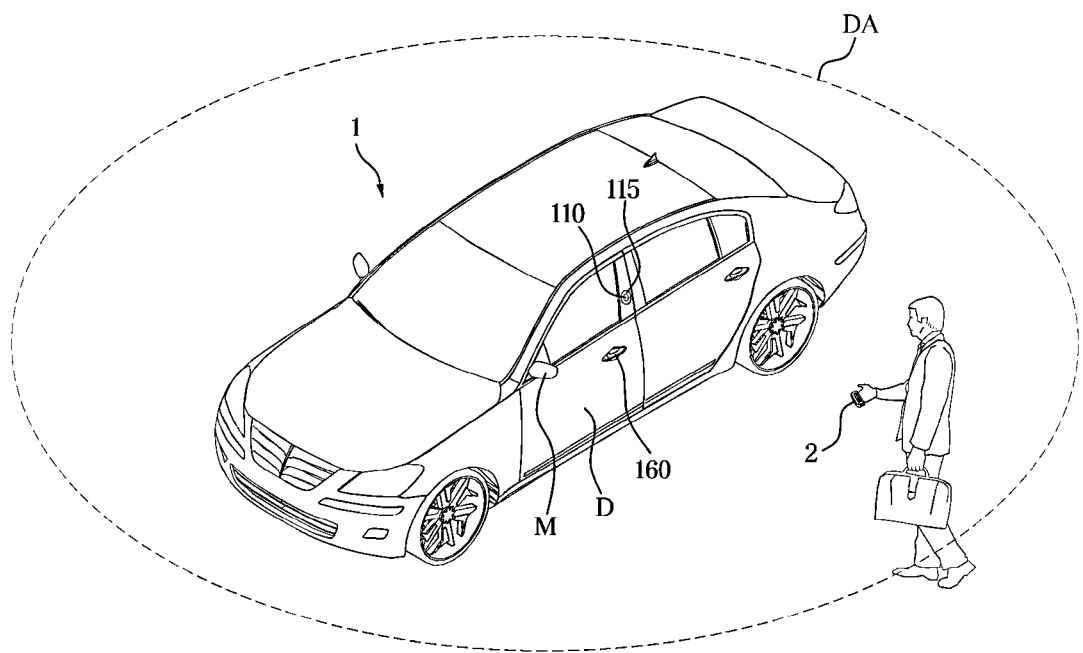
FIG. 5 illustrates a user with a remote controller approaching a vehicle according to an exemplary embodiment of the present disclosure.

FIG. 5 illustrates a user with a remote controller approaching a vehicle according to an exemplary embodiment of the present disclosure.

Referring to FIG. 5, it may be confirmed that a user with the remote controller 2 approaches within a preset radius DA based on the vehicle 1.

The preset radius DA may correspond to an LF critical distance, without being limited thereto.

In an exemplary embodiment of the present disclosure, based on receiving a RF band response signal transmitted from the remote controller 2 in response to an LF band search signal transmitted by the communicator 120, the controller 170 may detect that the user with the remote controller 2 is within the preset radius DA.

In an exemplary embodiment of the present disclosure, the controller 170 may identify a location of the remote controller 2 based on an UWB band response signal transmitted from the remote controller 2, detecting that the user is within the preset radius DA.

Also, the controller 170 may identify a location of the remote controller 2 based a strength of a Bluetooth signal transmitted from the remote controller 2, detecting that the user is within the preset radius DA.

In an exemplary embodiment of the present disclosure, the controller 170 may activate the camera 110 based on the remote controller 2 being detected to be within the preset radius DA.

Meanwhile, when receiving a door unlock request signal of RF band from the remote controller 2, a method for accurately identifying a location of the remote controller 2 does not exist.

Accordingly, the controller 170 may activate the camera 110 for a preset time period, based on receiving the door unlock request signal of RF band from the remote controller 2.

In the present instance, the preset time period may be set considering a time taken for the user to reach the vehicle 1 after opening a door D from a remote distance.

In the meantime, the controller 170 may switch the camera 110 to a deactivation state, based on receiving a door lock request signal of RF band from the remote controller 2.

According to an exemplary embodiment of the present disclosure, when the user with the remote controller 2 does not approach closely to the camera 110 because use of a face authentication system is not required, by activating the camera 110 before grasping a handle of the door D, the camera 110 may be used for another purpose other than face authentication.

The activated camera 110 may obtain a first image in real time, and transmit to the controller 170.

The controller 170 may be configured to determine a similarity score among the first image and a plurality of reference face images based on processing the first image (1300).

The user who does not desire to use the face authentication system because he or she has the remote controller 2 does not look at the camera 110, and thus the similarity score among the first image and the plurality of reference face images may be relatively low.

The vehicle 1 according to various exemplary embodiments of the present disclosure may utilize the first image in various ways depending on the similarity score among the first image obtained from the camera 110 and the plurality of reference face images.

Figure 6:
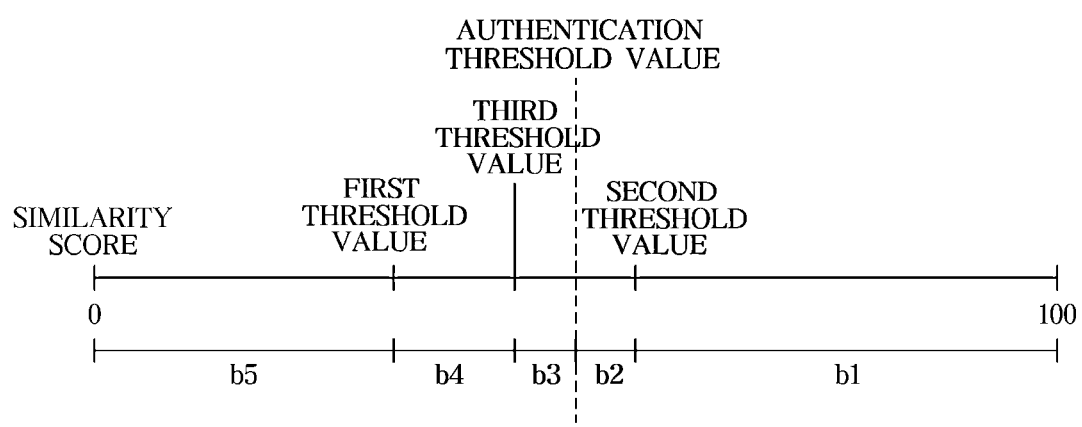
FIG. 6 is a diagram illustrating a similarity score.

FIG. 6 is a diagram illustrating a similarity score.

Referring to FIG. 6, a similarity score may have a value from 0 to 100, without being limited thereto. For example, the similarity score may have a value from 0 to 1.

In terms of face authentication, whether a similarity score is greater than or less than an authentication threshold value only matters. Accordingly, when an image obtained from the camera 110 is used for face authentication, the similarity score may be divided into a range greater than or equal to the authentication threshold value or a range less than the authentication threshold value.

Meanwhile, in an exemplary embodiment of the present disclosure, the similarity score may be divided into a plurality of ranges.

For example, the similarity score may be divided into a first range b1 greater than or equal to a second threshold value, a second range b2 greater than or equal to the authentication threshold value and less than the second threshold value, a third range b3 greater than a third threshold value and less than the authentication threshold value, a fourth range b4 greater than the first threshold value and less than or equal to the third threshold value, and a fifth range b5 less than or equal to the first threshold value.

The controller 170 may be configured to determine similarity scores between the first image and each of the reference face images, and determine a greatest value among the determined similarity scores as the similarity score among the first image and the plurality of reference face images.

For example, when a similarity score between the first image obtained from the camera 110 and a first reference face image among the plurality of reference face images is the greatest, the similarity score between the first image obtained from the camera 110 and the first reference face image may be determined as the similarity score among the first image and the plurality of reference face images.

When the similarity score between the first image obtained from the camera 110 and the first reference face image is greater than the first threshold value (Yes in operation 1350, Yes in operation 1400, Yes in operation 1410, Yes in operation 1420), the controller 170 may identify a personalization setting corresponding to the first reference face image (1500), and control the electronic device 140 according to the personalization setting corresponding to the first reference face image (1600).

Controlling the electronic device 140 according to the personalization setting corresponding to the first reference face image may be performed based on an opening of a door D being detected.

That is, the controller 170 may identify the personalization setting corresponding to the first reference face image, and control the plurality of electronic devices 140 based on the personalization setting identified based on an opening of the door D being detected by the door sensor 150.

The personalization setting corresponding to the first reference face image refers to a first user's personalization setting corresponding to the first reference face image.

That is, when the similarity score between the first image and the first reference face image belongs to the first range b1, the second range b2, the third range b3, or the fourth range b4, the controller 170 may control the electronic device 140 according to the personalization setting corresponding to the first reference face image.

In the present instance, the first threshold value may be set to be slightly or relatively lower than the authentication threshold value.

The first threshold value is a value to provide a personalization setting to a user that utilizes the remote controller 2 to get in the vehicle 1. The first threshold value is not required to be similar to the authentication threshold value, and is simply required to be set to identify the user with low accuracy.

For example, the first threshold value may be a value of a similarity score determined when a difference in feature value of feature points of faces included in the first image and the first reference face image is slightly significant.

That is, the personalization setting relates to convenience, not security like an access to the vehicle 1, and thus the first threshold value may be set to be slightly lower than the authentication threshold value.

According to an exemplary embodiment of the present disclosure, even though the user with the remote controller 2 has no intention of using the face authentication system, a face image obtained from the camera 110 may be used for personalization setting, providing user convenience.

Meanwhile, when the similarity score between the first reference face image and the first image obtained from the camera 110 is greater than or equal to the authentication threshold value, the controller 170 may be configured to determine that authentication is successful, and perform various functions of the vehicle 1 (e.g., unlocking the door D) according to the authentication success.

When the similarity score between the first reference face image and the first image obtained from the camera 110 is greater than or equal to the second threshold value (Yes in operation 1350), the controller 170 may control the electronic device 140 according to the personalization setting corresponding to the first reference face image (1500, 1600), as described above.

When the similarity score between the first reference face image and the first image obtained from the camera 110 is greater than or equal to the second threshold value, a face included in the first image corresponds to a face of a genuine user, and a change in the user's appearance and/or in environment is slightly insignificant. Accordingly, in an exemplary embodiment of the present disclosure, the first image may not be used for other purposes other than personalization setting.

When the similarity score between the first reference face image and the first image obtained from the camera 110 is greater than or equal to the authentication threshold value and less than the second threshold value (Yes in operation 1400), the controller 170 may store the first image in the storage 180 as the plurality of reference face images (1450).

In an exemplary embodiment of the present disclosure, registering the first image as a reference face image refers to registering the first image as an additional reference face image, without changing a reference face image directly registered by a user through a face registration process.

Referring to FIG. 6, the second threshold value may be set to be greater than the authentication threshold value. When the similarity score between the first reference face image and the first image obtained from the camera 110 is greater than or equal to the authentication threshold value but less than the second threshold value, the face included in the first image corresponds to a face of a genuine user, but it is estimated that the user's appearance and/or environment is changed.

Accordingly, in an exemplary embodiment of the present disclosure, the first image may be used to update a reference face image, in addition to personalization setting.

Figure 7:
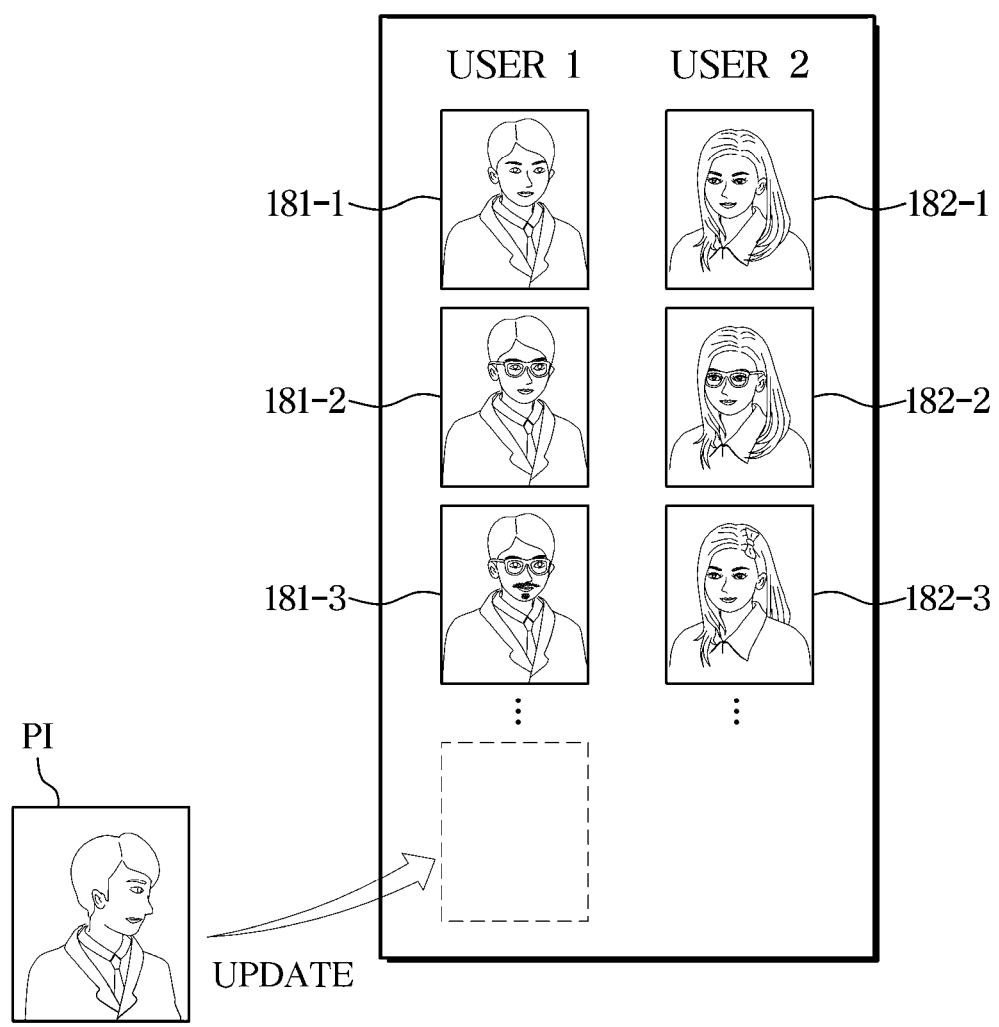
FIG. 7 is a conceptual diagram illustrating storing a new reference face image in a storage according to an exemplary embodiment of the present disclosure.

FIG. 7 is a conceptual diagram illustrating storing a new reference face image in a storage according to an exemplary embodiment of the present disclosure.

Referring to FIG. 7, a plurality of reference face images 181-1, 181-2, 181-3, 182-1, 182-2 and 182-3 may be stored in the storage 180.

For example, the storage 180 may store at least one reference face image 181-1, 181-2, 181-3 corresponding to a user 1 and at least one reference face image 182-1, 182-2 and 182-3 corresponding to a user 2.

Meanwhile, when a similarity score between a first image PI obtained from the camera 110 and any one reference face image 181-1 corresponding to the user 1 is greater than or equal to an authentication threshold value and less than a second threshold value, the controller 170 may store the first image PI in the storage 180.

The controller 170 may update the first image PI as one of the reference face images of the user 1.

That is, when a similarity score between the first image and a first reference face image belongs to the first range b1, the second range b2, the third range b3, or the fourth range b4, the controller 170 may control the electronic device 140 according to a personalization setting corresponding to the first reference face image.

That is, when the similarity score between the first image and the first reference face image belongs to the second range b2, the controller 170 may store the first reference face image in the storage 180 as a reference face image.

According to an exemplary embodiment of the present disclosure, even though a user with the remote controller 2 has no intention of using a face authentication system, a face image obtained from the camera 110 may be used for updating a reference face image, securing robustness of a face recognition function.

When the similarity score between the first image obtained from the camera 110 and the first reference face image is greater than a third threshold value and less than the authentication threshold value (Yes in operation 1410), the controller 170 may selectively store the first image in the storage 180 as the plurality of reference face images (1460).

In an exemplary embodiment of the present disclosure, selectively storing the first image in the storage 180 as the plurality of reference face images may include selectively storing the first image as the plurality of reference face images according to a user input.

For example, when the similarity score between the first image obtained from the camera 110 and the first reference face image is greater than the third threshold value and less than the authentication threshold value, the controller 170 may store the first image in the storage 180 as the plurality of reference face images, based on receiving a user input indicating that the user has an intention to register the first image as a reference face image.

Referring to FIG. 6, the third threshold value may be set to be smaller than the authentication threshold value. When the similarity score between the first reference face image and the first image obtained from the camera 110 is less than the authentication threshold value but greater than the third threshold value, even though a user's face included in the first image is similar to a reference face included in the reference face image, it is likely that the face included in the first image is another user's face or a genuine user's face that has been significantly changed in terms of appearance or environment.

That is, the third threshold value corresponds to a threshold value for estimating that, even though face authentication based on the first image has failed, the face included in the first image is another user's face looking similar to the genuine user's face, or is a genuine user's face that has been significantly changed in terms of appearance or environment.

Accordingly, when the similarity score between the first image obtained from the camera 110 and the first reference face image is less than the authentication threshold value but greater than the third threshold value, and when the first image is stored in the storage 180 as a new reference face image, a face image of the user 2 may be incorrectly stored as a reference face image of the user 2.

According to an exemplary embodiment of the present disclosure, when a similarity score belongs to the third range b3, whether to use the first image as a reference face image may be determined after inquiring about whether the user desires to register the first image.

When a similarity score belongs to the third range b3, an authentication object may be another user who looks similar to a genuine user, or a reliability of authentication may be determined to be low due to an external environmental condition even though the authentication object is a genuine user. Accordingly, reliability may be secured by inquiring about whether the authentication object included in the first image is a genuine user.

Figure 8:
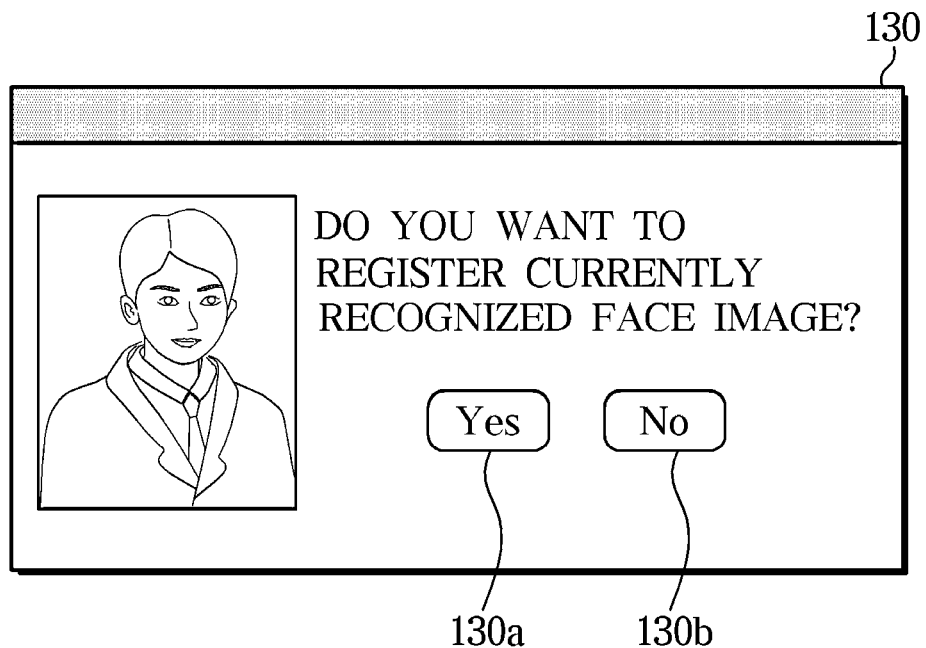
FIG. 8 illustrates an example where a vehicle asks a user whether to register a face image according to an exemplary embodiment of the present disclosure.

FIG. 8 illustrates an example where a vehicle asks a user whether to register a face image according to an exemplary embodiment of the present disclosure.

Referring to FIG. 8, after providing a personalization setting function based on a first image whose similarity score belonging to the third range b3, when a user gets in the vehicle 1 using the remote controller 2 and starts the vehicle 2, the user interface 130 may output the first image together with a visual indication (e.g., text) inquiring about a user's intention to register the first image.

The user may express the user's intention through buttons 130a and 130b provided on the user interface 130, without being limited thereto. For example, the user may express the user's intention through a voice command.

The controller 170 may register the first image as a reference face image based on receiving a user input indicating a user's affirmative reply through the first button 130a.

By contrast, the controller 170 may end a procedure without registering the first image as a reference face image based on receiving a user input indicating a user's negative reply through the second button 130b.

According to an exemplary embodiment of the present disclosure, when an authentication object included in the first image is another user who looks similar to a genuine user, or when a reliability of authentication may be determined to be low due to an external environmental condition even though the authentication object is a genuine user, an authentication success rate in a face authentication process may be improved by use of the first image as a reference face image after inquiring about a user's intention.

According to an exemplary embodiment of the present disclosure, even though a user with the remote controller 2 approaches the vehicle 1 with no intention to use face authentication technology, a variety of functions (e.g., a personalization setting function, a reference face update function) may be provided based on an image obtained from the activated camera 110.

In an exemplary embodiment of the present disclosure, the controller 170 may perform operations 1300, 1350, 1400, 1410, 1420, 1450, 1460 and 1500, until an opening of the door D is detected.

That is, the controller 170 may activate the camera 110, until the door D of the vehicle 1 is detected to be opened, based on receiving a response signal (RF band response signal, UWB band response signal, etc.) from the remote controller 2 through the communicator 120.

In another exemplary embodiment of the present disclosure, when the camera 110 is activated for a preset time period based on receiving a door unlock request signal from the remote controller 2, the controller 170 may perform operations 1300, 1350, 1400, 1410, 1420, 1450, 1460 and 1500, until the preset time period elapses.

As an exemplary embodiment of the present disclosure, the controller 170 may perform operations 1300, 1350, 1400, 1410, 1420, 1450, 1460 and 1500, until the remote controller 2 is not detected.

In an exemplary embodiment of the present disclosure, the controller 170 may deactivate the camera 110, based an opening of the door D being detected.

After the door D is opened, it is highly likely that the user is in the vehicle 1, and thus power waste may be prevented by deactivating the camera 110.

Meanwhile, in another exemplary embodiment of the present disclosure, a user may approach the vehicle 1 without the remote controller 2.

Figure 9:
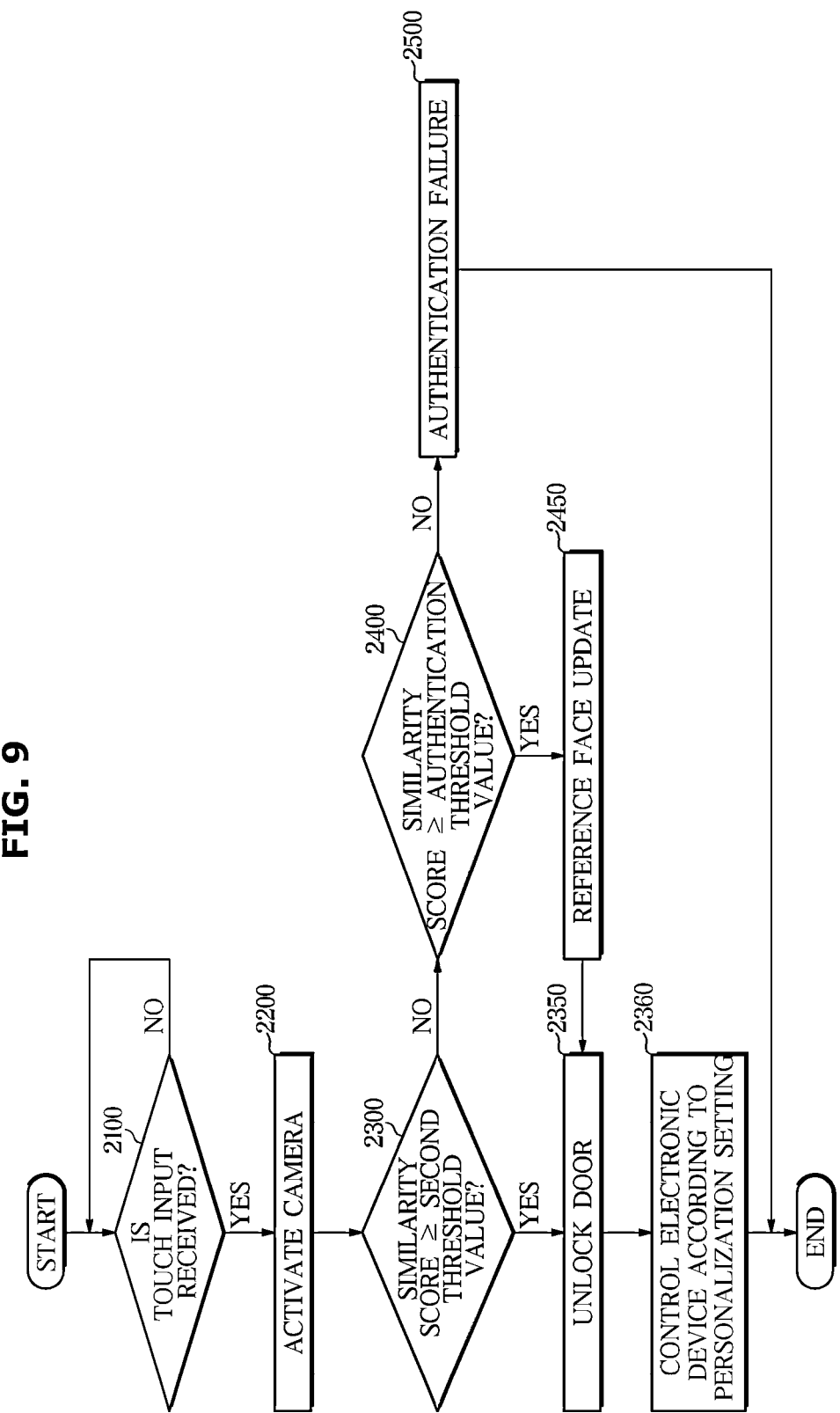
FIG. 9 is a flowchart illustrating a control method of a vehicle according to an exemplary embodiment of the present disclosure, when a user without a remote controller utilizes a face authentication system.

FIG. 9 is a flowchart illustrating a control method of a vehicle according to an exemplary embodiment of the present disclosure, when a user without a remote controller utilizes a face authentication system.

Referring to FIG. 9, as described above, the controller 170 may activate the camera 110 (2200), based on the touch sensor 160, provided on a door handle, being touched or pressed (Yes in operation 2100).

As an exemplary embodiment of the present disclosure, the controller 170 may activate the camera 110 based on an object in front of the vehicle 1 being detected by a proximity sensor.

That is, the camera 110 may be activated regardless of whether the remote controller 2 is detected.

When a similarity score between a first reference face image and a first image obtained from the camera 110 is greater than or equal to an authentication threshold value (Yes in operation 2300, Yes in operation 2400), the controller 170 may be configured to determine that authentication is successful and perform various functions (e.g., door unlock) of the vehicle 1 according to the authentication success (2350).

When the similarity score between the first reference face image and the first image obtained from the camera 110 is greater than or equal to the authentication threshold value (Yes in operation 2300, Yes in operation 2400), the controller 170 may identify a personalization setting corresponding to the first reference face image and control the electronic device 140 according to the personalization setting corresponding to the first reference face image (2360).

In an exemplary embodiment of the present disclosure, the controller 170 may control the visual indicator 115 to provide a visual feedback for notifying the authentication success.

Meanwhile, when the similarity score between the first reference face image and the first image obtained from the camera 110 is less than the authentication threshold value, the controller 170 may be configured to determine that authentication fails (2500).

In an exemplary embodiment of the present disclosure, the controller 170 may control the visual indicator 115 to provide a visual feedback for notifying the authentication failure.

According to various exemplary embodiments of the present disclosure, when the similarity score between the first reference face image and the first image obtained from the camera 110 is greater than or equal to the authentication threshold value but less than a second threshold value (Yes in operation 2400), the controller 170 may proceed with a reference face update (2450).

A description on the reference face update operation is omitted because the reference face update operation is the same as operation 1450 of FIG. 4.

According to an exemplary embodiment of the present disclosure, when a user utilizes a face recognition function, the personalization setting function may be provided together.

Figure 10:
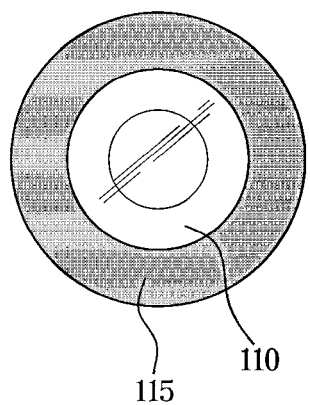
FIG. 10 illustrates an example of a feedback output from a visual indicator when a user with a remote controller is approaching, and an example of a feedback output from a visual indicator when a sensor receives a touch input or a pressure input.
Figure 10:
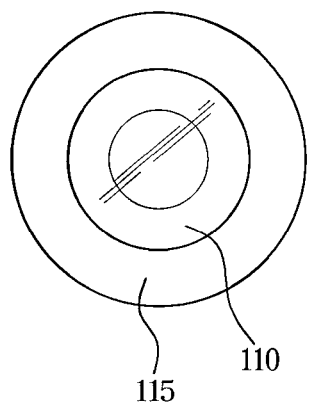

FIG. 10 illustrates an example of a feedback output from a visual indicator when a user with a remote controller is approaching, and an example of a feedback output from a visual indicator when a sensor receives touch input or pressure input.

Referring to FIG. 10, in an exemplary embodiment of the present disclosure, when the camera 110 is activated based on the remote controller 2 being detected, the controller 170 may control the visual indicator 115 to provide a first visual feedback.

In the present instance, the first visual feedback may include light with a first brightness.

Meanwhile, when the camera 110 is activated based on the touch sensor 160 being touched or pressed, the controller 170 may control the visual indicator 115 to provide a second visual feedback. In the present instance, the second visual feedback may include light with a second brightness.

When the camera 110 is activated based on receiving a touch input, a user is highly likely to intend to use a face authentication system.

Accordingly, the first visual feedback may be used for drawing a user's attention and the second visual feedback may be used for notifying that the camera 110 is activated.

To be used for drawing a user's attention, the visual indicator 115 is required to illuminate light with a higher intensity.

In an exemplary embodiment of the present disclosure, the first visual feedback may stand out more than the second visual feedback. For example, the first visual feedback may include light with the first brightness, the second visual feedback may include light with the second brightness, and the first brightness may be greater than the second brightness.

According to an exemplary embodiment of the present disclosure, the camera 110 may be used for another purpose other than face authentication by directing a gaze of the user that has no intention to use face authentication technology toward the camera 110.

Meanwhile, a portion of constituent components of the vehicle 1 may be a software component and/or a hardware component such as field-programmable gate array (FPGA) and application specific integrated circuit (ASIC).

As is apparent from the above, according to the exemplary embodiments of the present disclosure, a personalization setting function may be provided, even when a user gets in a vehicle without using a face authentication system.

Also, even when a user gets in a vehicle without using a face authentication system, a new reference face image may be stored based on an image obtained from a camera.

Meanwhile, the disclosed exemplary embodiments of the present disclosure may be stored in a form of a recording medium storing computer-executable instructions. The instructions may be stored in a form of a program code, and when executed by a processor, the instructions may perform operations of the disclosed exemplary embodiments of the present disclosure. The recording medium may be implemented as a computer-readable medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
    a camera configured to have a field of view facing an outside of the vehicle;
    a communicator configured to wirelessly communicate with a remote controller of the vehicle;
    a storage configured for storing a plurality of reference face images and a personalization setting corresponding to each of the reference face images; and
    a controller electrically connected to the camera, the communicator and the storage and configured to:
        detect the remote controller based on a signal received from the remote controller through the communicator;
        activate the camera based on the remote controller being detected;
        control at least one electronic device of the vehicle according to a personalization setting corresponding to a first reference face image among the plurality of reference face images, based on a similarity score between the first reference face image and a first image obtained from the camera being greater than a first threshold value; and store the first image in the storage as the plurality of reference face images, based on the similarity score being greater than or equal to an authentication threshold value and less than a second threshold value, wherein the first threshold value is less than the authentication threshold value.

2. The vehicle of claim 1, wherein the controller is configured to store the first image in the storage as the plurality of reference face images, based on receiving a user input indicating a user intention to register the first image as a reference face image, in response to the similarity score being greater than a third threshold value and less than the authentication threshold value, wherein the third threshold value is greater than the first threshold value.

3. The vehicle of claim 1, wherein the controller is configured to control the at least one electronic device according to the personalization setting corresponding to the first reference face image, based on an opening of a door of the vehicle being detected.

4. The vehicle of claim 1, wherein the controller is configured to deactivate the camera based on an opening of a door of the vehicle being detected.

5. The vehicle of claim 1, wherein the controller is configured to activate the camera for a preset time period based on receiving a door unlock request signal from the remote controller through the communicator.

6. The vehicle of claim 1, wherein the controller is configured to activate the camera until an opening of a door of the vehicle is detected, based on receiving a response signal from the remote controller through the communicator.

7. The vehicle of claim 1, further including:
a sensor provided in a door handle of the vehicle,
wherein the controller is configured to activate the camera, based on the sensor being touched or pressed.

8. The vehicle of claim 7, further including:
a visual indicator provided around the camera,
wherein the controller is configured to:
control the visual indicator to provide a first visual feedback, in response to the camera being activated based on the remote controller being detected; and
control the visual indicator to provide a second visual feedback, in response to the camera being activated based on the sensor being touched or pressed.

9. The vehicle of claim 8, wherein the first visual feedback includes light with a first brightness, the second visual feedback includes light with a second brightness, and the first brightness is brighter than the second brightness.

10. A control method of a vehicle including a storage storing a plurality of reference face images and a personalization setting corresponding to each of the reference face images, the control method comprising:
detecting, by a controller, a remote controller based on a wireless signal received from the remote controller;
activating, by the controller, a camera configured to have a field of view facing an outside of the vehicle based on the remote controller being detected;
controlling, by the controller, at least one electronic device of the vehicle according to a personalization setting corresponding to a first reference face image among the plurality of reference face images, based on a similarity score between the first reference face image and a first image obtained from the camera being greater than a first threshold value; and
storing, by the controller, the first image in the storage as the plurality of reference face images, based on the similarity score being greater than or equal to an authentication threshold value and less than a second threshold value,
wherein the first threshold value is less than the authentication threshold value.

11. The control method of claim 10, further including:
storing, by the controller, the first image in the storage as the plurality of reference face images, in response to receiving a user input indicating a user intention to register the first image as a reference face image, based on the similarity score being greater than or equal to a third threshold value and less than the authentication threshold value,
wherein the third threshold value is greater than the first threshold value.

12. The control method of claim 10, wherein the controlling of the at least one electronic device of the vehicle according to the personalization setting corresponding to the first reference face image is performed based on an opening of a door of the vehicle being detected.

13. The control method of claim 10, further including:
deactivating, by the controller, the camera based on an opening of a door of the vehicle being detected.

14. The control method of claim 10, wherein the activating of the camera includes activating the camera for a preset time period, based on receiving a door unlock request signal from the remote controller.

15. The control method of claim 10, wherein the activating of the camera includes activating the camera until an opening of a door of the vehicle is detected, based on receiving a response signal from the remote controller.

16. The control method of claim 10, further including:
activating, by the controller, the camera, based on a sensor provided in a door handle being touched or pressed.

17. The control method of claim 16, further including:
controlling, by the controller, a visual indicator, provided around the camera, to provide a first visual feedback, in response to the camera being activated based on the remote controller being detected; and
controlling, by the controller, the visual indicator to provide a second visual feedback, in response to the camera being activated based on the sensor being touched or pressed.

18. The control method of claim 17, wherein the first visual feedback includes light with a first brightness, the second visual feedback includes light with a second brightness, and the first brightness is brighter than the second brightness.

* * * * *